United States Patent
Deng et al.

[11] Patent Number: 5,992,083
[45] Date of Patent: Nov. 30, 1999

[54] FLEXIBLE FISHING LURE

[75] Inventors: Shyang-fenn Deng, 11,510 Palo Alto Rd., Lusby, Md. 20657; Hsiang-yu Chiang-Deng, Lusby, Md.

[73] Assignee: Shyang-fenn Deng, Las Vegas, Nev.

[21] Appl. No.: 08/812,269

[22] Filed: Mar. 6, 1997

Related U.S. Application Data

[63] Continuation-in-part of application No. 08/569,301, Dec. 8, 1995, abandoned.

[51] Int. Cl.⁶ .................................................... A01K 85/00
[52] U.S. Cl. .......................................... 43/42.15; 43/42.09
[58] Field of Search ............................... 43/42.09, 42.15, 43/42.08, 42.48

[56] References Cited

U.S. PATENT DOCUMENTS

| | | | |
|---|---|---|---|
| 1,207,588 | 12/1916 | Maus | 43/42.09 |
| 1,264,658 | 4/1918 | King | 43/42.08 |
| 1,454,820 | 5/1923 | Readle | 43/42.09 |
| 1,710,102 | 4/1929 | Moore | 43/42.08 |
| 1,740,335 | 12/1929 | Cowan | 43/42.09 |
| 1,836,651 | 12/1931 | Davenport | 43/42.48 |
| 2,121,114 | 6/1938 | Beck | 43/42.48 |
| 2,465,064 | 3/1949 | Colosimo | 43/42 |
| 2,573,592 | 10/1951 | Nickel | 43/42.09 |
| 2,948,982 | 8/1960 | Galpin | 43/42.15 |
| 3,165,857 | 1/1965 | Koziba | 43/42.15 |
| 3,357,124 | 12/1967 | Stepacoff | 43/42.09 |
| 3,359,674 | 12/1967 | Strumor | 43/42.06 |
| 3,621,600 | 11/1971 | Dworski | 43/42.09 |
| 3,947,989 | 4/1976 | Bart | 43/42.09 |
| 4,054,004 | 10/1977 | Schott | 43/42.09 |

Primary Examiner—Kurt Rowan

[57] ABSTRACT

A fishing lure with separable sections for a head, a body extension, a main body, and a tail can be easily assembled and disassembled to provide the flexibility to make different types and lengths of lures. The present invention has provisions for securing various attachments to the head, the body extension, the main body, and the tail. The body extension is a device for changing the length of the lure. Both the head and the body extension have a chamber into which either a rattler or some kind of weight can be inserted. The rattler makes a rattling sound which will attract fish. The weight can keep the lure at a certain depth in the water to imitate a suspended bait fish. At least two of the head, the body extension, the main body, and the tail can be connected by a special securing device to create relative motion between them, thus imitating an injured fish being retrieved from the water. The head or the tail, when used with an attachment such as a plastic worm, can be used alone as a lure known as a jig. The main body can also be used alone as a lure known as a surface popper. Various attachments include treble hooks, weedless hooks, spinner blades, propeller blades, crank bait lips, wobbler blades, plastic skirts, and the like. Using the separable sections of the head, the body extension, the main body, and the tail with various attachments, an angler can assemble at least thirty (30) different combinations of lures.

6 Claims, 5 Drawing Sheets

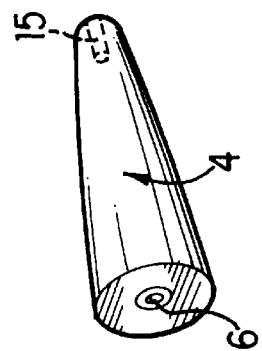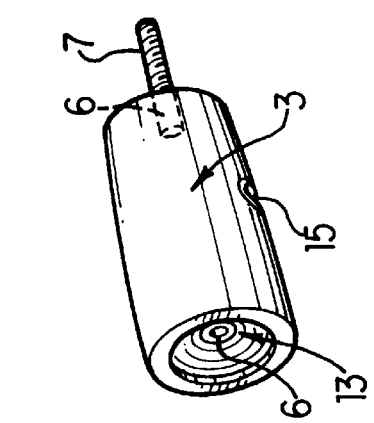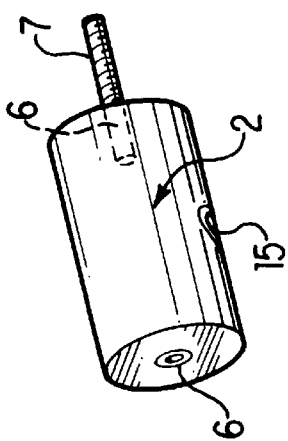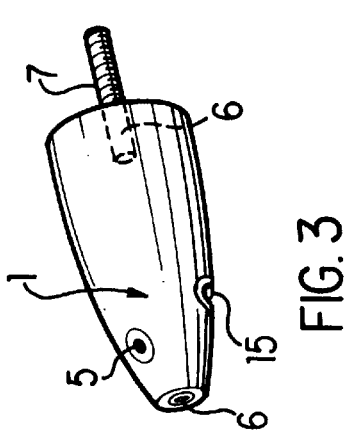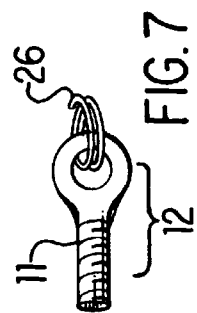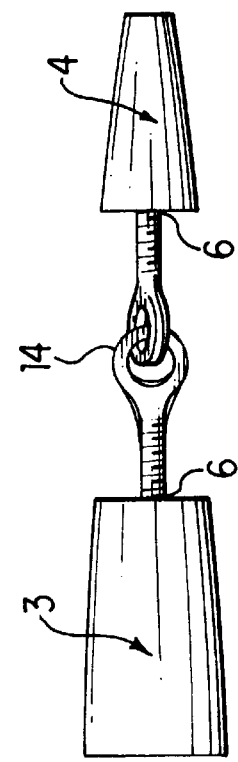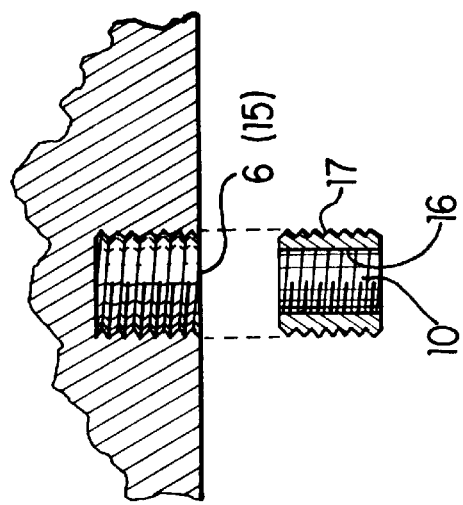

FLEXIBLE FISHING LURE

CROSS-REFERENCE TO RELATED APPLICATION

This application is a continuation-in-part of U.S. patent application Ser. No. 08/569,301 filed on Dec. 8, 1995, now abandoned.

BACKGROUND OF THE INVENTION

1. Field of the Invention

This invention generally relates to fishing lures and more specifically to a lure with the flexibility to make different types and lengths of lures using separable parts and various attachments.

2. Description of the Related Art

A preliminary patentability search located the following pertinent prior art references in Class 43, Subclass 42.09:

| U.S. Pat. No. | Inventor | Issue Date |
| --- | --- | --- |
| 1,477,864 | Bolton | 12/18/1923 |
| 1,867,458 | Keuper | 07/12/1932 |
| 2,573,399 | Cannon | 10/30/1951 |
| 2,883,785 | Croft | 04/28/1959 |
| 3,009,279 | Jacobson | 11/21/1961 |
| 3,172,227 | Mackey | 03/09/1965 |
| 3,359,674 | Strumor | 12/26/1967 |
| 4,619,067 | West | 10/28/1986 |
| 5,070,639 | Pippert | 12/10/1991 |
| 5,182,875 | Righetti | 02/02/1993 |
| 5,331,762 | Banks | 07/26/1994 |

Of all the references cited above, only five previous inventions are somewhat similar to the present invention. As it will become apparent in the sections to follow, the present invention has more diversity and interchangeability than the other cited inventions.

For example, the invention described in U.S. Pat. No. 5,331,762 to Banks relates to a fishing lure with interchangeable heads. This fishing lure does not have a single head with provision for securing various attachments. Thus, this arrangement is not convenient for fishermen to carry because many combination lures require many different heads. The body of the Banks' invention cannot be used by itself as a fishing lure due to its extending helical ramp and also cannot have any extension, thus further limiting any diversified use of the body. Additionally, there is no separable tail section for the Banks' invention to produce a fishing lure, such as an injured minnow. Moreover, the lure body of Banks does not have any provision for inserting either a rattler to produce a fish-attracting sound or some kind of weight to keep the lure at a certain water depth to imitate a suspended bait fish. Furthermore, the single split ring of Banks is not so easy to use to interchange hooks.

In the invention described in U.S. Pat. No. 1,867,458 issued to Keuper, there is disclosed a fishing lure with detachable body sections that have tapered dovetail-shaped tongues and grooves to alter only the length of the lure. In Keuper's invention, there is no provision either for securing different attachments to make many combinations of lures or for using each part of the body as an individual lure, such as either a jig, a surface popper, or the like.

In the invention described in U.S. Pat. No. 3,359,647 issued to Strumor, there is disclosed a fishing lure with adjustable sections. This lure provides for inserting weights into cavities in the body sections, but these cavities are not suitable for inserting rattlers to produce rattling sounds. Although the length of Strumor's invention is adjustable, it does not have any provision for securing various attachments to make many combinations of lures. Each adjustable body piece of Strumor's invention cannot be used as individual lure because of its extended studs, whereas the head, the main body, and the tail section of the present invention can be used as individual lures. Additionally, Strumor's lure does not provide any means for interchanging different kinds of hooks.

In the invention described in U.S. Pat. No. 3,009,279 issued to Jacobson, there is disclosed a fishing lure with interchangeable mounting means for hooks. The mounting mechanism in Jacobson's lure is very complicated whereas, in the present invention, interchangeability can be accomplished by securing different kinds of hooks to different parts of the lure using simply the combination of a threaded eye screw and a split ring.

In the invention described in U.S. Pat. No. 2,573,399 issued to Cannon, there is disclosed a fishing lure with separable head and body portions and a hook-mounting strip. However, the hook-mounting strip does not provide any interchangeability for using different kinds of hooks. Also, the two separable head and body parts are configured for inserting some kind of weight, but do not have any provision for securing various attachments to make many combinations of lures. Furthermore, the two separable head and body parts of Cannon cannot be used as individual lures due to the axially extending screw-threaded portion in the head.

SUMMARY OF THE INVENTION

By the present invention, an improved fishing lure is made. Accordingly, one of the objectives of the present invention is to provide a lure which allows for flexibility and diversity in making many combinations of lures by using separable sections of a head, a body extension, a main body, a tail, and a plurality of separable body extension sections with various attachments, such as spinner blades, propeller blades, wobbler blades, crank bait lips, treble hooks, and single weedless hooks.

Another objective of the present invention is to provide a lure which gives an angler the option of using one or more body extensions to vary lure lengths.

Another objective of the present invention is to provide a lure which includes securing devices to ensure that, when connected together, the head, body extension, main body, and tail maintain their proper relative alignment with one another and prevent any separation from each other.

Another objective of the present invention is to provide a lure which gives the angler the option of using only the head.

Another objective of the present invention is to provide a lure which gives the angler the option of using only the tail.

A further objective of the present invention is to provide a lure which gives the angler the option of using the combination of only the main body and the tail together.

A further objective of the present invention is to provide a lure which includes devices for securing various attachments to the head, body extension, main body, and tail without using any tools.

A further objective of the present invention is to provide a lure which includes devices for securing different types of hooks to the body extension, main body, and tail without using any tools.

A further objective of the present invention is to provide a lure which has a chamber in the head and in the body extension for inserting a rattler to produce a fish-attracting sound.

Another objective of the present invention is to provide a lure which has a chamber in the head and in the body extension for inserting some kind of weight to keep the lure at a certain depth in the water in order to imitate a suspended bait fish.

Another objective of the present invention is to provide a lure in which at least two of the head, the body extension, the main body, and the tail can be connected by a special securing device to create relative motion between them to imitate an injured fish.

Another objective of the present invention is to provide a lure in which the head, body extension, main body, and tail can be made of wood or plastic to give positive buoyancy and can be painted in different fish-attracting colors and patterns.

A final objective of the present invention is to provide a lure which is inexpensive, dependable, and fully effective in accomplishing its intended purpose of catching fish.

With these and other objectives which will become more readily apparent, the invention includes the combination and arrangement of parts hereinafter described and illustrated in the attached drawings.

BRIEF DESCRIPTION OF DRAWINGS

FIG. 3 is a perspective view of the head.

FIG. 4 is a perspective view of the body extension.

FIG. 5 is a perspective view of the main body.

FIG. 6 is a perspective view of the tail.

FIG. 7 shows the arrangement of a threaded eye screw with a split ring.

FIG. 8 shows a cross-sectional view of a threaded insert together with a threaded hole into which the threaded insert is to be permanent embedded.

FIG. 9 shows the arrangement of a double-jointed connecting eye screw.

FIG. 10 shows a stick bait with two treble hooks.

FIG. 11 shows a lure with crank bait lips and two treble hooks.

FIG. 12 shows a surface popper with a weedless single hook attached at the tail.

FIG. 13 shows a lure that imitates an injured fish with crank bait lips and two treble hooks.

FIG. 14 shows a lure with crank bait lips attached at the head and a weedless single hook attached at the tail.

FIG. 15 shows a stick bait with a spinner blade attached at the front of the head and a propeller blade attached at the rear of the tail.

FIG. 16 shows a lure with a wobbler blade and two treble hooks.

FIG. 17 shows a surface popper with two treble hooks.

FIG. 18 shows a flexible surface popper using the double-jointed connecting eye screw of FIG. 9.

FIG. 19 shows a jig with a head having a plastic worm attached thereto.

DETAILED DESCRIPTION OF THE PREFERRED EMBODIMENTS

Figure 1:
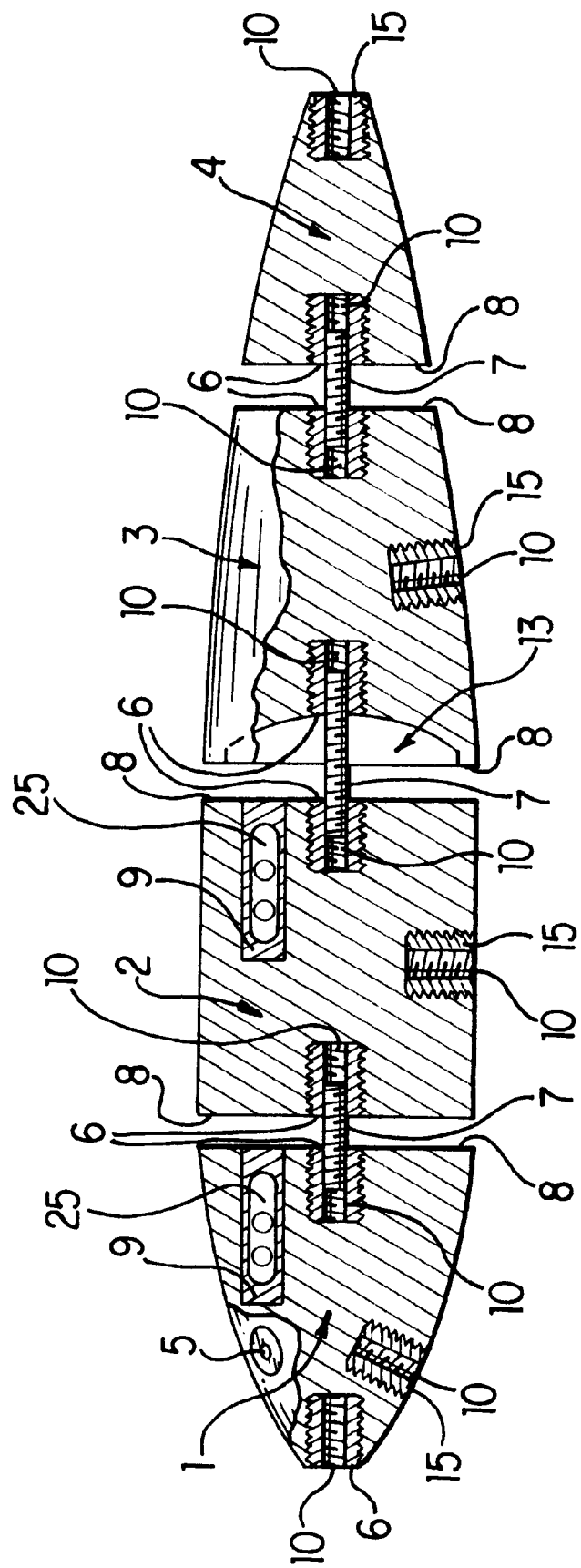
FIG. 1 is a partial cross-sectional view of the head, body extension, main body, and tail of the present invention, showing securing arrangements provided for connecting various attachments to the different sections. Additionally, chambers in the head and the body extensions are shown with a rattler in each chamber.

Referring now particularly to FIG. 1, the present invention is torpedo-shaped to resemble the shape of a fish and to provide the ability for the fishing lure to swim in the water. The lure comprises a head 1, a body extension 2, a main body 3, and a tail 4. Contacting surfaces 8 between the head 1 and the body extension 2, between the body extension 2 and the main body 3, and between the main body 3 and the tail 4, are smooth and flat. The surfaces 8 together with securing devices described below provide positive contact between different sections of the lure. Outside diameters at the large end of the head 1, at both ends of the body extension 2, and at the large end of the main body 3, are exactly the same. The purpose for having the same outside diameter is to allow for matching interchangeability between the head 1, the body extension 2, and the main body 3. Also, there is better alignment of the different contacting surfaces 8 of the head 1, the body extension 2, and the main body 3, particularly between the contacting surfaces 8 of the head 1 and the main body 3 either when the body extension 2 is not used or when more than one body extension 2 is used. The head 1 is bullet-shaped to resemble a fish head and forms a front part of the torpedo-shaped lure. The back end of the head 1 is larger than the front end. The head 1 has painted eyes 5. Small diameter threaded holes 6 are provided at the front end and the back end of the head 1. A first threaded insert 10 is permanently embedded into hole 6 at the front end and at the back end of the head 1. A threaded connecting pin 7 can be turned into a second threaded insert 10 at the back end of the head 1 for the purpose of connecting the head 1 either to the large front end of the body extension 2 or to the large front end of the main body 3. At a lower underside of the head 1, another small threaded hole 15 is provided. A third threaded insert 10 is permanently embedded into the hole 15 for the purpose of securing an attachment thereto. A nonthreaded hole 9 is provided in the back ends of the head 1 and the body extension 2. The hole 9 serves as a chamber into which a rattler 25 is inserted to make a fish-attracting sound when the lure is being retrieved from the water. Alternatively, a weight can be inserted into the hole 9 to keep the lure at a certain depth to imitate a suspended bait fish. The body extension 2 is cylindrical in shape with the outside diameter at the front end and the back end being the same. This outside diameter is the same as the diameter at the back end of the head 1 and at the front end of the main body 3. The purposes for using the same outside diameter are twofold: first, to maintain the torpedo shape of the lure; and second, to provide proper alignment when any two of the head 1, the body extension 2, and the main body 3 are connected together. Threaded holes 6 are provided at the front end and at the back end of the body extension 2. Threaded inserts 10 are permanently embedded into these holes 6. The threaded hole 6 at the front end of the body extension 2 is used to connect with the head 1 via the threaded connecting pin 7. The threaded hole 6 at the back end of the body extension 2 is used to connect with the main body 3 via another threaded connecting pin 7. The lure can be made longer when the body extension 2 is connected between the head 1 and the main body 3. Multiple body extensions 2 can be used for the same purpose. The body extension 2 has another threaded hole 15 on its underside. A fourth threaded insert is permanently embedded in the threaded hole 15. If two body extensions 2 are used, the back end of the first extension mates with the front end of the second extension. The main body 3 is connected with the body extension 2 at its front end and is connected with the tail 4 at its back end. The large end and the small end of the main body 3 taper towards each other to form another part of the torpedo-shaped lure. At the large end of the main body 3, a slightly concave hole 13 is provided to make a popping action in the water when the main body 3 alone is used as a surface popper. At the front center of the main body 3, another threaded hole 6 is provided. A fifth threaded insert 10 is permanently embedded into this hole 6 for the purpose of connecting either the head 1 or the body extension 2 with the main body 3 via the threaded connecting pin 7. Another threaded hole 6 is provided at the back end of the main body 3. A sixth threaded insert 10 is permanently embedded into this hole 6 for the purpose of connecting the main body 3 with the tail 4 via another threaded connecting pin 7. Another threaded hole 15 is provided at the lower center belly of the main body 3. A seventh threaded insert 10 is permanently embedded to this hole 15 for the purpose of connecting various attachments to the main body 3. The tail 4 has a large front end and a small back end. The purpose of the large end and the small end is to resemble a fish tail and to form the rear part of the torpedo-shaped lure. The large front end of the tail 4 has the same outside diameter as the back end of the main body 3. Again, the purpose for using the same outside diameter is to ensure that the main body 3 and the tail 4 are properly matched when connected together. The front end of the tail 4 mates with the back end of the main body 3 when they are connected together via the threaded connecting pin 7. At the front end of the tail 4, a threaded hole 6 is provided. The hole 6 at the front end is used to secure the tail 4 with the main body 3 via the threaded connecting pin 7. Another threaded hole 15 is provided at the back end of the tail 4. Another threaded insert 10 is permanently embedded into the hole 15 for the purpose of connecting a trailing attachment thereto.

Figure 2:
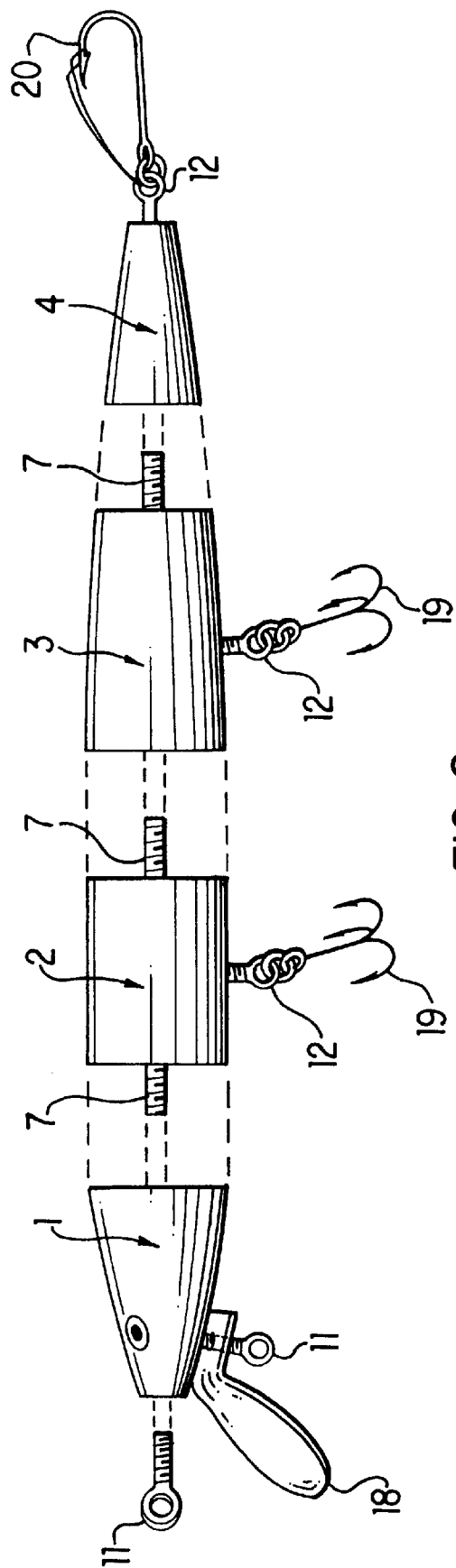
FIG. 2 is an exploded side elevational view of the present invention showing a threaded eye screw which is used to tie the lure at the front of the head to a fishing line. A crank bait lip, a first treble hook, a second treble hook, and a single weedless hook are attached to the head, the body extension, the main body and the tail, respectively.

In FIG. 2, the lure is illustrated in an exploded side elevational view in which the head 1, the body extension 2, the main body 3, and the tail 4 are aligned along a central longitudinal axis passing through the connecting pins 7. At the front end of the head 1, a first threaded eye screw 11 is attached for the purpose of tying a fish line thereto. At a lower underside of the head 1, crank bait lips 18 are attached thereto by a second threaded eye screw 11. At undersides of the body extension 2 and the main body 31 threaded eye screw pieces 12 are used to attach treble hooks 19 thereto. Also, at the rear of the tail 4, another threaded eye screw piece 12 is used to attach a single weedless hook 20 thereto.

In FIG. 3, the head 1 is shown in a perspective view with the eye 5 painted thereon. Threaded holes 6 are shown at the front end and at the back end of the head 1. The connecting pin 7 is inserted into the threaded hole 6 illustrated in phantom lines in the back end of the head 1. Another threaded hole 15 is shown in the lower underside of the head 1.

In FIG. 4, the body extension 2 is shown in a perspective view with threaded holes 6 in the front end and in the back end thereof. The connecting pin 7 is inserted into the hole 6 shown in phantom lines at the back end. Another threaded hole 15 is shown in the underbelly of the body extension 2.

In FIG. 5, the main body 4 is seen in a perspective view with threaded holes 6 in the front end and in the back end thereof. The connecting pin 7 is inserted into the hole 6 seen in phantom lines in the back end. The concave hole 13 is illustrated in the front end of the main body 3. Also, another threaded hole 15 is shown in the lower center belly of the main body 3.

In FIG. 6, the tail 4 is shown in a perspective view with the threaded hole 6 at its large end and with another threaded hole 15 shown in phantom lines at its rear end.

In FIG. 7, the threaded eye screw piece 12 is shown to include the threaded eye screw 11 and a split ring 26.

In FIG. 8, threaded holes 6 and 15 are shown to be identical with the threaded insert 10 ready to be turned therein. The threaded insert 10 has internal threads 16 and external threads 17. The external threads 17 on the insert 10 ensure that the insert 10 is permanently embedded into the holes 6 or 15.

In FIG. 9, a double-jointed connecting eye screw 14 is shown secured at both ends into holes 6 located at the back end of the main body 3 and at the front end of the tail 4 to provide relative motion therebetween to imitate an injured fish being retrieved from the water.

Although not shown in either FIG. 9 or any of the other drawings, the double-jointed connecting eye screw 14 may also be secured at both ends into at least two facing holes 6 located at the back end of the head 1 shown in FIG. 3, the front end and the back end of the body extension shown in FIG. 4, and the front end of the main body 3 shown in FIG. 5 to provide relative motion therebetween to imitate an injured fish.

FIG. 10 to 19 show ten different combinations of lures that the present invention can make.

Figure 10:
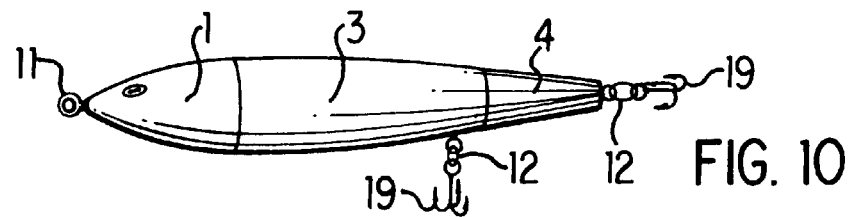
FIGS. 10 to 19 show ten different combinations of lures that the present invention can make.

In FIG. 10, a stick bait is shown with a head 1, a main body 3, and a tail 4. At the front of the head 1, the threaded eye screw 11 is secured for attaching a fishing line thereto. At the lower center belly of the main body 3, the threaded eye screw piece 12 is secured and has attached thereto the treble hook 19. At the rear end of the tail 4, another threaded eye screw piece 12 is secured with another treble hook 19 trailing therebehind.

Figure 11:
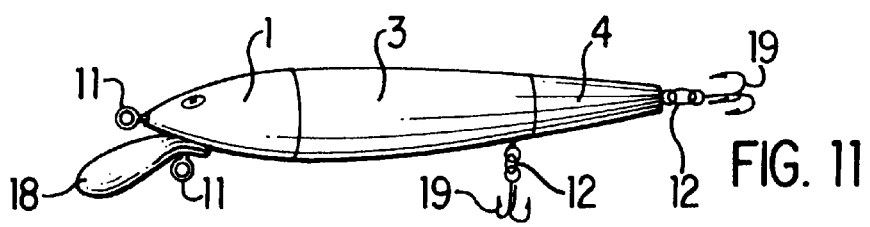

FIG. 11 shows the same combination as FIG. 10 except that crank bait lips 18 are secured by a second threaded eye screw 11 to the front underside of the head 1.

Figure 12:
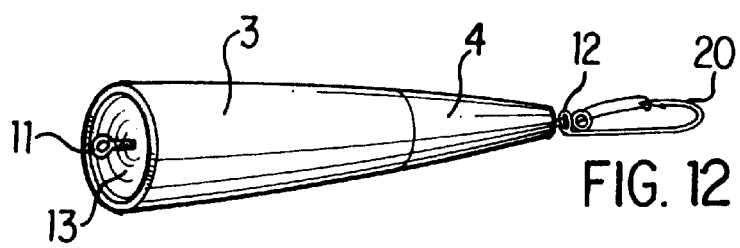

FIG. 12 shows a surface popper formed by the main body 3 and the tail 4. At the front end of the main body 3, the threaded eye screw 11 protrudes from the concave hole 13. At the rear end of the tail 4, the weedless hook 20 is secured thereto by the threaded eye screw piece 12.

Figure 13:
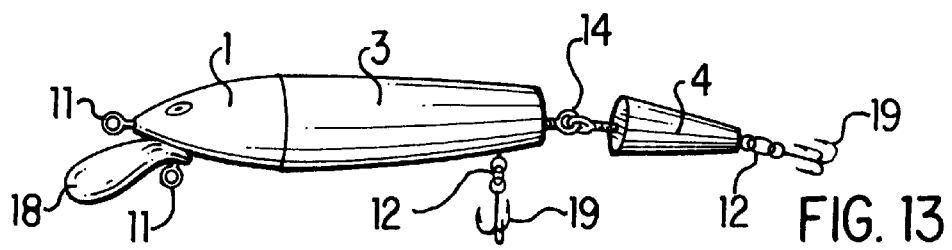

FIG. 13 shows a lure that resembles an injured fish with the head 1, the main body 3, and the tail 4. This lure is identical to the lure illustrated in FIG. 11 except for the substitution of the flexible double-jointed connecting eye screw 14 in FIG. 13 in place of the rigid connecting pin 7, not shown in FIG. 11 but shown in FIG. 2.

Figure 14:
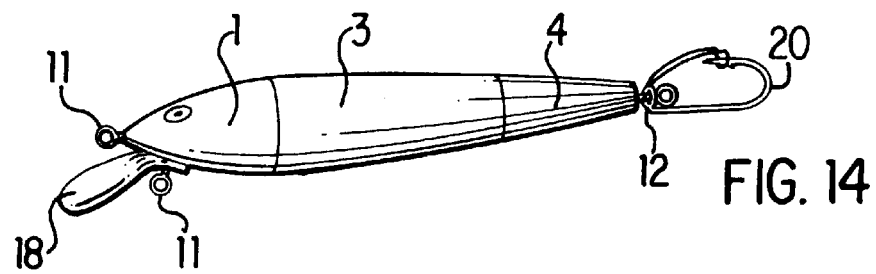

FIG. 14 shows another lure identical to the lure shown in FIG. 11, except for two differences: first, the main body 3 in FIG. 14 does not have any treble hook 19 secured by the eye screw piece 12 of FIG. 11; and second, the weedless hook 20 at the rear end of the tail 4 in FIG. 14 is substituted for the treble hook 19 of FIG. 11.

Figure 15:
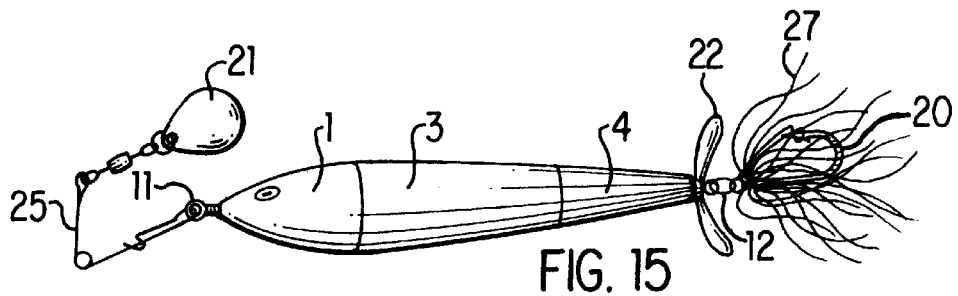

FIG. 15 shows a lure with the head 1, the main body 3, and the tail 4. At the front of the head 1, the eye screw 11 secures a spinner blade 21 from a blade-connecting wire 25. At the rear end of the tail 4, the threaded eye screw piece 12 secures a propeller blade 22 thereto and the single hook 20 trails therebehind with a plastic skirt 27 attached thereto.

Figure 16:
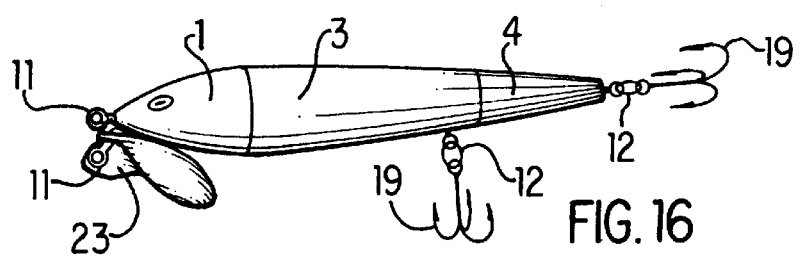

In FIG. 16, there is shown a lure identical to the lure shown in FIG. 11, except that a wobbler blade 23 in FIG. 16 is substituted for the crank bait lips 18 in FIG. 11.

Figure 17:
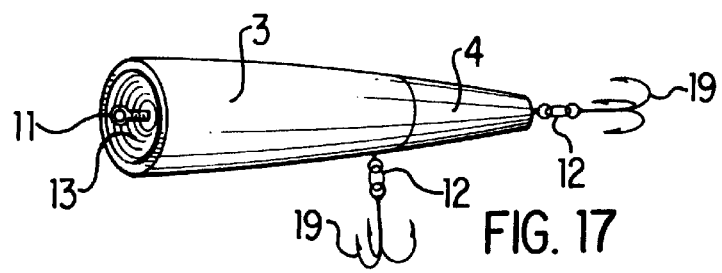

FIG. 17 shows a surface popper identical to the popper shown in FIG. 12 except in two respects. First, the popper in FIG. 17 has the treble hook 19 in place of the single weedless hook 20 in FIG. 12. Second, the popper in FIG. 17 has another treble hook 19 attached by the eye screw piece 12 to the underbelly of the main body 3 whereas the popper in FIG. 12 does not have such an additional attachment.

Figure 18:
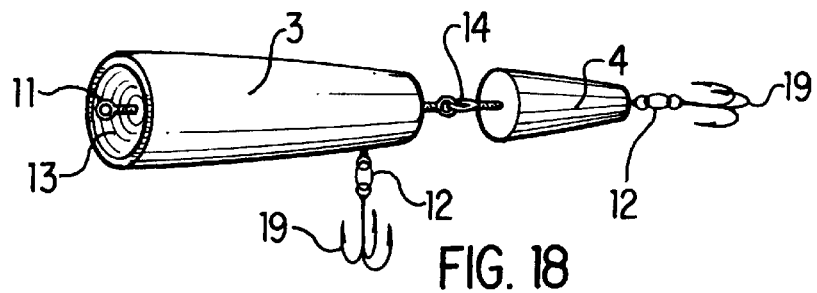

FIG. 18 shows a flexible surface popper identical to the popper shown in FIG. 17, except for the substitution of the double-jointed connecting eye screw 14 in FIG. 18 in place of the rigid connecting pin 7, not shown in FIG. 17 but shown in FIG. 2.

Figure 19:
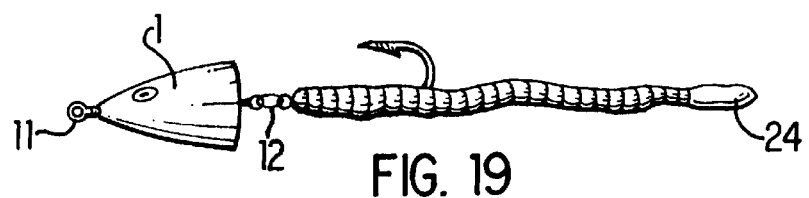

FIG. 19 shows a lure known as a jig in which the head 1 has the eye screw 11 at its front end and the threaded eye screw piece 12 at its back end has attached thereto a plastic worm 24 to trail and to wiggle therebehind. The plastic worm 24 in FIG. 19 can also be attached to the large end of the tail 4 to serve as the same type of lure.

All the attachments, such as the spinner blade 21 shown in FIG. 15, the wobbler blade 23 shown in FIG. 16, the crank bait lips 18 shown in FIG. 11, the propeller blade 22 shown in FIG. 15, the weedless single hook 20 shown in FIG. 12, the treble hooks 19 shown in FIG. 10, and the plastic worm 24 shown in FIG. 19, can be attached to either the head 1, the body extension 2, the main body 3, or the tail 4 by using the threaded eye screw piece 12 which includes the threaded eye screw 11 and the split ring 26 shown in FIG. 7. The spinner blade 21 can be attached to either the front end of the head 1 or the front end of the main body 3. The propeller blade 22 can be attached to either the front end of the head 1 or the back end of the tail 4. The wobbler blade 23 and the crank bait lips 18 are always attached to the front underside of the head 1. The eye screw 11 of the threaded eye screw piece 12 mates with the internal threads 16 of the threaded insert 10 which is permanently embedded into the holes 6 or 15 in either the head 1, the body extension 2, the main body 3, or the tail 4. The attachment of either the treble hook 19 or the single hook 20 is secured to the threaded eye screw piece 12 by using the split ring 26 shown in FIG. 7. The threaded eye screw piece 12 allows an easy and quick change of any attachment and really makes all of the various attachments interchangeable.

The head 1 including the eyes 5, the body extension 2, the main body 3, and the tail 4 can be painted in different colors and patterns to attract fish.

By using the various attachments to the head 1, the body extension 2, the main body 3, and the tail 4, at least thirty (30) different combinations of lures can be obtained. This interchangeable feature means that anglers can make their own lures for different fishing conditions, such as water clarity, depth, temperature, climatic season, and size of the fish species being sought.

The head, the body extension, the main body, the tail, and all attachments can fit into a small tackle box. Thus, this lure can help eliminate the trouble of carrying many different types of lures for fishing at different conditions.

It is understood that the present invention is not limited to the embodiments described above, but encompasses any and all embodiments within the scope of the following claims.

We claim:

1. A fishing lure comprising; a plurality of body sections selected from a head, a body extension, a main body, and a tail, each having a front end and a back end with a threaded hole being centered in each of the front end and the back end and being aligned along a central longitudinal axis;

a threaded insert secured in the threaded hole in each of the front end and the back end of said body sections, said threaded insert having external threads for mating engagement inside the threaded hole, said threaded insert also having internal threads;

a removable threaded connecting pin for engaging with the internal threads of the threaded insert to join adjacent body sections along said longitudinal axis;

a first threaded eye screw mounted in said threaded insert of the front end of said head to attach a fishing line;

a second threaded eye screw mounted in said threaded insert of said back end of a rear section to mount a fish hook;

wherein different combinations of said body sections can be assembled to change the appearance of the fishing lure.

2. A fishing lure according to claim 1, wherein said head, said main body and said body extension have at least one other threaded hole in an underside thereof.

3. A fishing lure according to claim 2, wherein a threaded insert having internal and external threads is secured into said one other threaded hole to mount a fish hook.

4. A fishing lure according to claim 1, further comprising a rattler mounted in a non-threaded hole in said head.

5. A fishing lure according to claim 1, further comprising a rattler mounted in a non-threaded hole in said body extension.

6. A fishing lure according to claim 2, wherein said main body has a concave hole in said front end.

* * * * *